Feb. 27, 1951 R. E. T. RINGKJOB ET AL 2,543,062
LOCAL BATTERY PARTY LINE LOCKOUT SYSTEM
Filed Aug. 2, 1947
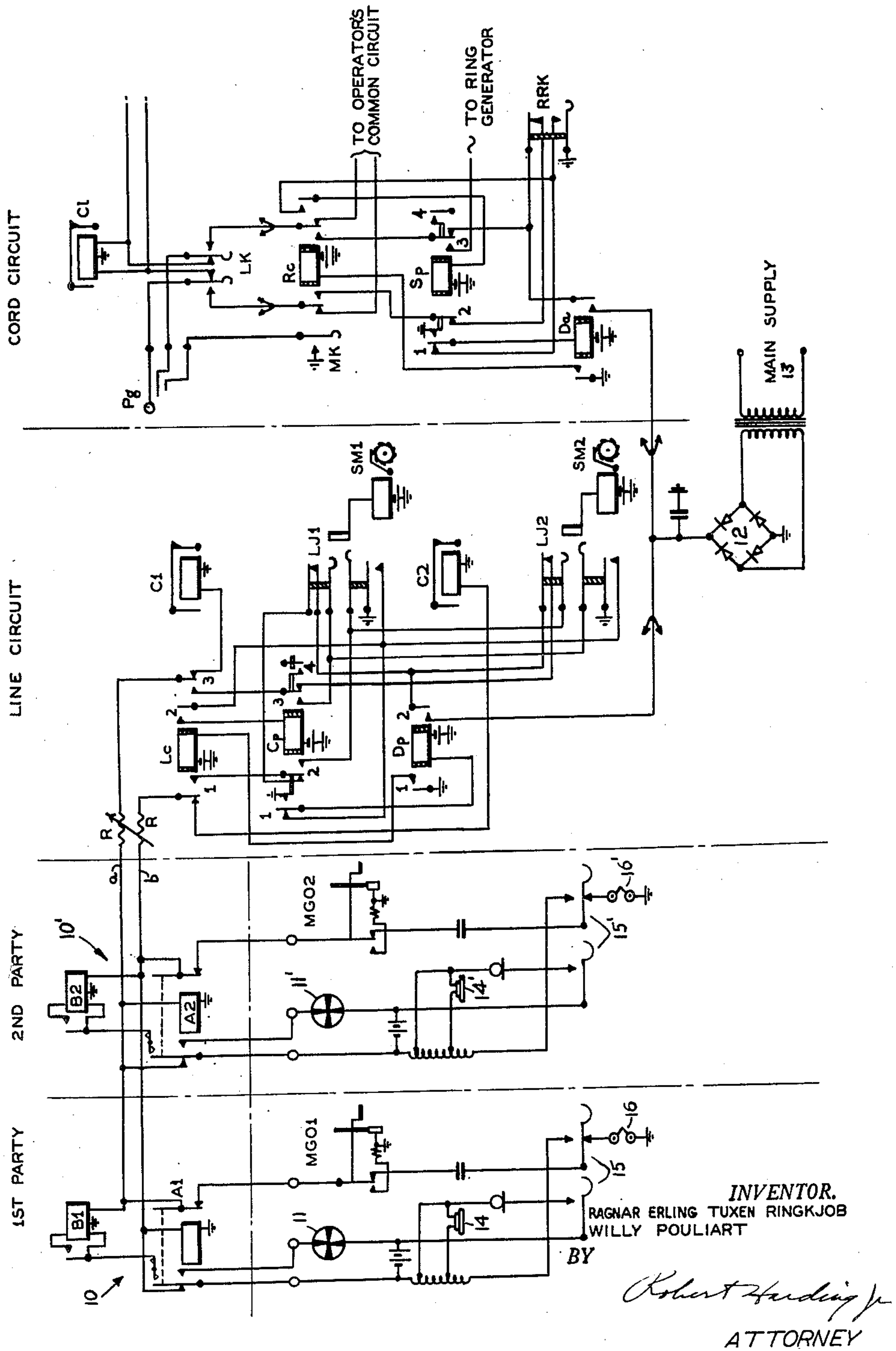
INVENTOR.
RAGNAR ERLING TUXEN RINGKJOB
WILLY POULIART
BY
Robert Harding Jr
ATTORNEY Patented Feb. 27, 1951 2,543,062

UNITED STATES PATENT OFFICE 2,543,062

LOCAL BATTERY PARTY-LINE LOCKOUT SYSTEM

Ragnar Erling Tuxen Ringkjob and Willy Pouliart, Antwerp, Belgium, assignors to International Standard Electric Corporation, New York, N. Y., a corporation of Delaware Application August 2, 1947, Serial No. 765,746
In the Netherlands January 24, 1940

Section 1, Public Law 690, August 8, 1946
Patent expires January 24, 1960

10 Claims. (Cl. 179—30)

This invention relates to telecommunication exchange systems, and more particularly to those having party-line service.

Objects of the invention are, to provide two-party line service including revertive calling, separate metering, and secrecy features for substations of the local battery type, without the presence of either A. C. or D. C. current on the line during the conversation.

The differentiation of the two parties is made in the usual manner by the use of one wire signalling (subsets with grounded ringer and grounded magneto) each subset being represented in the exchange by a corresponding jack and drop. The connection of the second party's subset, jack and drop to the party-line being reversed in relation to the first party.

Secrecy is ensured by associating with each subset—i. e. on each of the subscriber's premises—an interlocking relay-pair, the lock-nut component of which carries two cut-off contacts for isolating the substation from the line. This lock-out relay is operated over the wire used for signalling the other party, and is connected directly and permanently to the wire in question, whereas the unlocking component is operated from and connected directly and permanently to the wire used for signalling the associated substation. The unlocking relay is provided with a low resistance winding which is short-circuited via a make contact of the relay itself, so that if both components of the interlocking relay-pair are energised at the same moment, and the current is removed from both relays at the same moment, the lock-out relay will be unlatched owing to the slower release of the unlocking relay.

Thus selection of one or other party is effected as follows, assuming for instance that the "*a*" wire is used for signalling the first party:

(*a*) An impulse on the "*a*" wire cuts out the 2d party (and brings in the first party if the latter is isolated from the line).
(*b*) An impulse on the "*b*" wire cuts out the first party (and brings in the 2d party if the latter is isolated from the line).
(*c*) An impulse given on both wires and discontinued on both wires simultaneously brings both substations onto the party line.

The current used for selecting impulses is preferably direct current of required voltage to obtain necessary limits for a given line resistance and given value of line leakages. The direct current impulses are given automatically on the required wires by a group of relays individual per party line and located in the exchange.

Revertive calling is provided by means of a revertive call key in the operator's common circuit, and by leaving the answering plug of the operator's cord in the calling jack and not using the second plug. When the revertive call key is depressed, a preliminary impulse is sent on the signalling wire of the wanted party bringing in the latter's subset onto the line and cutting out the calling party. This impulse is followed by a ring on the same wire thus calling up the wanted party, and the ring is followed by an impulse connected to and discontinued on both wires simultaneously thus bringing in both parties.

The sequence of the above operations is ensured automatically by a group of relays in the operator's common circuit.

The above method of operation which does not necessitate the completion of the revertive call by means of the cord and 2d jack of the party line, avoids the presence of a talking current shunt on the line due to the "*a*" and "*b*" wires being crossed between the two line jacks.

Individual metering is ensured by using separate message registers controlled over the sleeve of the corresponding line jacks.

Busy condition of the party line is always indicated to the cut-out party by a signal operated locally over a make contact of the lock-out relay.

It is an advantage of the present arrangement that each set is connected to the two-party line via two break contacts of the associated locking relay, as compared with prior party-line circuits in which each party's substation was connected to the two-party line proper over series break contacts of both interlocking relays, thus multiplying the number of contacts in the line and consequently the chances of having an open wire. This is the minimum number of contacts required to ensure secrecy.

Again, as a result of the aforementioned feature in the prior arrangements, the two-party line must pass in series over both parties' premises, since the interlocking relays must be located together on one of the subscriber's premises in order to avoid an excessive number of wires between the two parties' substations.

In the present arrangement, the two-party line proper need not pass in series via the subscribers' premises, but may be branched out at any convenient point so as to maintain the line length at a minimum.

A further advantage of the present arrangement, in which each interlocking relay is directly associated with the corresponding subset, is that it allows the introduction of a busy signal in the party line set without any additional line wires. Prior party-line circuits do not foresee the adjunction of busy signals with the parties' substations, and could not do so without increasing the number of wires between subsets.

In the present arrangement there is no switching between the interlocking relay-pairs of the two parties. These relays have therefore few contacts and give reliable operation.

In order that the invention may be clearly understood, a description will now be given of one of its embodiments, reference being made for this purpose to the accompanying drawing, which shows a 2-party line arrangement designed to work in conjunction with a local battery exchange and catering for secret service, revertive calling and separate metering features.

The complete equipment comprises:

(*a*) on each of the subscriber's premises:

A local battery substation indicated at 10 and 10' with busy signal 11 and 11' and a mechanically interlocking relay-pair A1, B1 and A2, B2. The relays A1 and A2 lock mechanically when operated and are only released by the operation of the corresponding relays B1 and B2.

(*b*) in the line circuit at the exchange:

Two calling drops, C1 and C2, corresponding line jacks, LJ1 and LJ2, and service meters and a group of three relays, Lc, Cp, and Dp.

(*c*) in the operator's common circuit:

A group of three relays, Rc, Sp, and Da, and a key RRK required for establishing revertive calls.

Furthermore, the cord circuits are provided with a two-winding clearing drop C1 connected to ground at the middle point.

In addition to the 24 volt battery required for the operation of the relays in the exchange, it is necessary to have a common source of higher D. C. voltage required for signalling purposes. On the drawing this high D. C. voltage is shown to be provided by means of a rectifier 12 working from the main supply 13. If required, however, this arrangement may be replaced by a high voltage D. C. battery of small capacity, the current consumption required for signalling being very reduced.

GENERAL DESCRIPTION OF OPERATION

*Ordinary call from subscriber to the exchange*

A subscriber wishing to originate a call removes his receiver 14, 14' from the switchhook 15, 15' and sends ringing current on one wire by means of the grounded magneto MGO1, MGO2 of his subset. If we assume, for instance, that the first party is originating the call, ringing will be sent out on the "*a*" wire, thus causing the calling drop C1 in the line circuit to function. The operator answers the call by inserting the answering plug Pg of the cord in the jack LJ1, corresponding to the drop which has been operated. The fact of inserting the plug in the calling jack causes an impulse to be sent back on the "*a*" wire, thus energizing the lock-out relay A2 of the second party. This party is then completely cut out from the line and cannot interfere on the existing call. The busy signal on the subset which is cut out indicates that the line is busied by the other party.

When the calling subscriber has made known the wanted subscriber's number, the city operator completes the call in the usual manner and conversation may take place.

The call is metered manually by depressing the MK key of the cord. The subscriber's meter SM1 will be energised, since the call has been answered by busying the line jack LJ1.

When, at the end of conversation, the clearing signal is given by the first party to release, the clearing drop C1 in the cord operates and the city operator may remove the plug from the jack LJ1. The fact that the plug is removed causes an impulse to be sent out on both wires of the party line simultaneously thus causing the interlocking relay-pairs A—B to be unlocked; the energisation of the unlocking relays B continuing beyond that of the lock-out relays A, by reason of their self-closed slow-release windings. Both subscriber sets are again connected to the line and either of the two parties may originate a new call.

If the second party had originated the call, the ringing current sent out from his magneto MGO2 would have operated the calling drop C2 of the line circuit over the "*b*" wire and the operator would have answered the call by inserting the plug Pg of the cord in jack LJ2.

The fact of having inserted the cord plug in the line jack LJ2 would have caused an impulse to be sent back over the "*b*" wire in order to operate the lock-out relay A1 of the first party, thus cutting him out from the line.

By removing the cord plug from the jack LJ2 at the end of the conversation, the D. C. impulse is sent out on both wires simultaneously just as in the case of a call originated by the first party in order to unlock the interlocking relay-pair.

*Incoming call to one of the parties*

When one of the parties must be called up from the local battery exchange, the operator inserts the cord plug Pg in the line jack corresponding to the party which must be called up. The fact of inserting the cord plug in the jack sends out, as explained for an outgoing call, an impulse on one wire thus operating the lock-out relay A of the party which must be cut out. The wanted party is then rung in the usual manner but over one wire only, the return to ground being given in the called party's subset. In the exchange, the ringing machine or magneto must, of course, also be grounded for the return.

At the end of the call when the plug is removed from the line jack, the interlocking relays are unlocked in the same manner as explained for an outgoing call.

*Revertive call*

In case one party, for instance, the first, wants to call up the second party of the same party line, he originates a call to the exchange in the same manner as an ordinary call. When this call is answered by the city operator, the calling party advises her that the second party of the line is required. The operator then without further manipulation of the cord, depresses the revertive ringing key RR*k* and rings back on the line. At the moment RRK key is depressed, an impulse is sent back on the "*b*" wire thus causing the lock-out relay A1 of the calling subscriber to be operated and the lock-out relay A2 of the second party to be unlocked by the energization of B2. The calling party is thus cut out from the line. As soon as the aforementioned impulse is over, ringing current is sent out on the "b" wire thus causing the ringer of the second party's circuit set to function.

When key RRK is released, the ringing current is removed from the line and an impulse is sent out on both wires simultaneously, thus unlocking the operated lock-out relay A1 and placing both subsets in parallel on the line. Conversation may then take place.

The end of the conversation is indicated by the first of the two parties to send the clearing signal on the line thus causing the clearing drop in the cord circuit to function. When the cord plug is removed from the line jack, an impulse is sent out simultaneously on both wires as explained previously but this time without effect since both interlocking relays are already unlocked.

DETAILED CIRCUIT DESCRIPTION

*Outgoing call from subscriber to city exchange*

When the first party removes his receiver 14 from the switchhook 15 and turns the crank of his subset magneto NGO1, alternating current is sent out on the "a" wire, to which are connected the unlocking relay B1 of the first party's interlocking relay-pair, the lock-out winding A2 of the second party's interlocking relay, and the calling drop C1 in the city exchange line circuit. The alternating current sent out on the line may, or may not, be sufficiently strong to energise relays B1 and A2, but whether these relays energise or not, is of no consequence provided that calling drop C1 functions, as will be seen hereafter.

The operator inserts the plug Pg in the line jack LJ1 and depresses the listening key LK. When the plug Pg of the operator's cord is introduced into the line jack LJ1, a ground is given for the energisation of relay Dp via cp1 back.

Relay Dp when energised, causes the operation of relay Lc and also causes a D. C. impulse to be sent out on the "a" wire as follows: D. C. voltage from rectifier, dp2 front, back contact of line Lj2, cp3 back, lc3 front, to the "a" wire.

The voltage given by the aforementioned impulse is sufficiently high to cause the energisation of lock-out relay A2 on the second party's premises and unlocking relay B1 on the first party's premises.

When relay Lc has energised, the calling drops C1 and C2 are removed from the line and the circuit is closed for the energisation of relay Cp. The latter relay, however, is slow energising so that the D. C. impulse remains on the "a" wire as long as relay Lc is energised with relay Cp de-energised. When relay Cp comes up, the line is switched over to the tip and ring contacts of the line jack LJ1, the D. C. impulse is ended, and relay Dp remains energised over cp1 front.

At the moment the D. C. impulse of the "a" wire is ended, relay A2 remains mechanically locked up, thus disconnecting the second party's subset from the line. Relay B1 on the first party's premises releases but the operation and release of relay B1 have no effect on the circuit operation since the lock-out relay A1 has not received any current.

When the call is completed by the operator, conversation may take place and the call is metered by depressing key MK thus causing the energisation of the subcriber's meter SM1 over the sleeve of jack LJ1 and the cord sleeve.

At the end of the conversation when the clearing drop C1 operates in the cord, the operator removes the cord plug Pg from the jack LJ1, and ground is removed at the bottom contact of the jack thus causing the de-energisation of relay Cp.

During the time that Cp is back and relay Lc remains energised under the control of the slow releasing relay Dp, the high D. C. voltage is connected to both the "a" and "b" wires; mains supply 13, dp2 front, top back contact of LJ1, cp2 back, lc1 front, to "b" wire, and again, mains supply 13, dp2 front, top back contact of LJ2, cp3 back, lc3 front, to "a" wire.

The four relays of the two interlocking relay-pairs are energised, but the B relays, once they have closed their make contacts, are always slower to release than the A relays so that, when the D. C. impulse is disconnected from the "a" and "b" wires at the moment when relay Dp opens its contact dp2, both the A relays will be unlocked and will return to their inoperative positions.

Relay Lc de-energises a short while after relay Dp has de-energised and during the slow releasing time of relay Lc the line is short-circuited and thus discharged before it is switched back to the calling drops C1 and C2. False operation of the calling drops is thus avoided.

A call originated by the second party causes the circuit to function in a manner exactly similar to that described for the first party, except that the D. C. impulse, sent out at the moment the city operator plugs in the jack of the calling line, is given on the "b" wire instead of on the "a" wire.

*Call from exchange to one of the parties*

The circuit operation for such a call is exactly the same as that described above except that the operator seizes the wanted party without the calling drop having been operated.

*Revertive call*

When one of the parties, for instance the first, wants to call up the second party of the 2-party line, he originates a call in its usual manner and the city operator answers the call just like an ordinary call by inserting a cord plug Pg in the jack LJ1. The insertion of the cord plug causes an impulse to be sent out on the "a" wire as explained previously, thus locking up relay A2 and isolating the substation of the second party. When, however, the operator has been advised that the wanted party is the second party of the 2-party line, she depresses the RRK key in her common circuit; at the same time ringing current with ground return is given on the wire connected to the contact sp3 front.

At the moment key RRK closes its lower contact, relays Da, Sp and Rc energise in a manner similar to that explained for Dp, Cp and Lc in the line circuit, thus causing a D. C. impulse from the rectifier 12 to be sent out on one wire. In this case, however, it is the "b" wire over which the impulse is sent, the "a" wire being opened in the common circuit at the break contact of key RRK. The circuit is traced from the rectifier 12, Da front, Sp back, Rc front, LK operated, ring of plug Pg, ring of jack LJ1, Cp2 front, Lc1 front, to the "b" wire.

The D. C. impulse which is sent out on the "b" wire causes the energisation of relays B2 and A1. The calling party is thus cut out from the line and relay A2 is unlocked. When relays Sp and Rc are energised, ringing current is sent out on the "b" wire, and causes the ringer 16' of the second party to function: Sp3 front, Rc front, LK front, ring of plug Pg and jack LJ1, Cp2 front, Lc1 front.

When key RRK is released, relays Da, Sp and Rc function in a manner similar to relays Dp, Cp and Lc for a release, so that a D. C. impulse is sent simultaneously on both wires, thus causing all four relays of the interlocking relay-pairs to become energised and the relay A1 to be unlocked at the moment the D. C. impulse is ended. Ringing may be repeated as often as required, each time key RRK is depressed, the calling party being cut out from the line and the second party being rung up.

The further operation of the circuit is similar to that described for an ordinary call.

*Busy conditions*

During the time that a party has been cut out from the 2-party line, the corresponding A relay is mechanically locked in operative position and the busy signal 11, 11' of the subset is energised over a make contact of the A relay. The required current is provided by the local battery.

We claim:

1. A two-wire party-line telephone system comprising a pair of substations, a lock-out relay associated with each of said substations, each of said substations being bridged across the two-wires of said system through back contacts of its associated relay, the lock-out relay of one of said substations having its winding connected to one of said wires and the lock-out relay of the other substation having its winding connected to the other of said wires, means at the exchange where said two wires terminate for sending a voltage impulse over the wire connected to the winding of one of said lock-out relays for operating said relay when a call originates at the substation associated with the other of said relays, means for automatically locking said lock-out relays in operated condition when once operated, and means associated with each substation and under control of said exchange for unlocking said lock-out relays.

2. A two-wire party-line telephone system as claimed in claim 1 in which the means for unlocking the lock-out relays are a pair of relays each having its winding connected to one of the two wires to which its associated lock-out relay is not connected.

3. A party-line telephone system as claimed in claim 2, characterised in that the interlocking relay-pair has one relay permanently connected between one wire of the line and earth, and the other relay permantly connected between the other wire of the line and earth.

4. A party-line telephone system as claimed in claim 3, characterised in that each subscriber is represented in the exchange by an individual jack and drop.

5. A party-line telephone system as claimed in claim 4 in which the means at the exchange for sending a voltage impulse over the wire connected to one of the lock-out relays is operated when the jack associated with the substation containing the other lock-out relay is busied and means is provided for sending voltage impulses over both the wires of the line when the jack is freed for operating the unlocking relays of both substations.

6. A party-line telephone system as claimed in claim 5, characterised in that the unlocking relay of an interlocking relay-pair is made of slower release time than the lock-out relay.

7. A party-line telephone system as claimed in 1, characterised in that the exchange comprises an operator's common circuit which includes a revertive-call key, and means for causing a direct-current impulse to be sent over the appropriate wire of the line to lock out the calling subscriber when said key is depressed.

8. A party-line telephone system as claimed in claim 7, characterised in that means is provided for causing ringing current to be sent to the wanted subscriber when the revertive-call key is depressed.

9. A party-line telephone system as claimed in claim 7, characterised in that means is provided for causing a direct-current impulse to be sent on both wires of the line to remove the lock-out at both substations when the revertive-call key is restored.

10. A party-line telephone system as claimed in claim 1, characterised in that each substation is provided with a busy indicator operated over a make contact of the associated lock-out relay.

RAGNAR ERLING TUXEN RINGKJOB.
WILLY POULIART.

REFERENCES CITED

The following references are of record in the file of this patent:

UNITED STATES PATENTS

| Number | Name | Date |
|---|---|---|
| 1,227,735 | Barrows et al. | May 29, 1917 |
| 1,850,192 | Willis | Mar. 22, 1932 |
| 1,899,014 | Christian et al. | Feb. 28, 1933 |
| 2,245,799 | McClew et al. | June 17, 1941 |